United States Patent
Bae et al.

(10) Patent No.: US 8,546,162 B2
(45) Date of Patent: Oct. 1, 2013

(54) METHOD FOR FORMING LIGHT GUIDE LAYER IN SEMICONDUCTOR SUBSTRATE

(75) Inventors: Dae-Lok Bae, Seoul (KR); Byung-Lyul Park, Seoul (KR); Pil-Kyu Kang, Anyang-si (KR); Gil-Heyun Choi, Seoul (KR); Kwang-Jin Moon, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 129 days.

(21) Appl. No.: 13/243,763

(22) Filed: Sep. 23, 2011

(65) Prior Publication Data

US 2012/0088323 A1    Apr. 12, 2012

(30) Foreign Application Priority Data

Oct. 7, 2010  (KR) .................. 10-2010-0097808

(51) Int. Cl.
*H01L 21/00* (2006.01)
(52) U.S. Cl.
USPC ........ 438/31; 257/98; 257/E33.068; 438/432; 250/227.11; 362/551; 362/582
(58) Field of Classification Search
USPC .......... 438/29, 31, 32, 432, 466, 436; 257/98, 257/E33.067, E33.068, E31.127; 250/227.11, 250/227.21, 227.24; 362/551, 555, 582
See application file for complete search history.

(56) References Cited

U.S. PATENT DOCUMENTS

| | | | | |
|---|---|---|---|---|
| 7,354,840 B1 * | 4/2008 | Kempf | ................. | 438/360 |
| 8,422,845 B2 * | 4/2013 | Kang et al. | ................. | 385/131 |
| 2009/0273076 A1 * | 11/2009 | Choi et al. | ................. | 257/702 |
| 2011/0133063 A1 * | 6/2011 | Ji et al. | ................. | 250/227.24 |
| 2011/0188828 A1 * | 8/2011 | Kang et al. | ................. | 385/131 |
| 2011/0250738 A1 * | 10/2011 | Kang et al. | ................. | 438/481 |
| 2012/0039564 A1 * | 2/2012 | Kang et al. | ................. | 385/14 |
| 2012/0219250 A1 * | 8/2012 | Ren et al. | ................. | 385/14 |

FOREIGN PATENT DOCUMENTS

| | | | |
|---|---|---|---|
| EP | 1037344 | * | 9/2000 |
| JP | 2006-156949 | | 6/2006 |
| JP | 2008-098646 | | 4/2008 |
| KR | 1020100029629 | | 3/2010 |

OTHER PUBLICATIONS

IBM, Two-level Chip Optical Waveguide, IBM Technical Disclosure Bulletin, Nov. 1, 1990, vol. 33, Issue. No. 6B, pp. 34-38.*
AIPN, machine translation, Fukada JP 2008-098646 (translated Jan. 28, 2013), all pages.*
AIPN, machine translation, Naiki JP 2006-156949 (translated Mar. 21, 2013), all pages.*

* cited by examiner

*Primary Examiner* — Fernando L Toledo
*Assistant Examiner* — Victoria K Hall
(74) *Attorney, Agent, or Firm* — F. Chau & Associates, LLC

(57) ABSTRACT

A method for forming a light guide layer with improved transmission reliability in a semiconductor substrate, the method including forming a trench in the semiconductor substrate, forming a cladding layer and a preliminary light guide layer in the trench such that only one of opposite side end portions of the preliminary light guide layer is in contact with an inner sidewall of the trench, and performing a thermal treatment on the substrate to change the preliminary light guide layer into the light guide layer.

20 Claims, 9 Drawing Sheets

METHOD FOR FORMING LIGHT GUIDE LAYER IN SEMICONDUCTOR SUBSTRATE

CROSS-REFERENCE TO RELATED APPLICATION

This application claims priority from Korean Patent Application No. 10-2010-0097808 filed on Oct. 7, 2010 in the Korean Intellectual Property Office, and all the benefits accruing therefrom under 35 U.S.C. 119, the contents of which in its entirety are herein incorporated by reference.

BACKGROUND

1. Technical Field

The present inventive concept relates to a method for forming a light guide layer in a semiconductor substrate.

2. Discussion of the Related Art

Electrical interconnections may have limitations in a semiconductor device operating at a high speed. In a known interconnection structure having high integration and high miniaturization, the electrical interconnections cause crosstalk between lines and electromagnetic interference (EMI) between lines to degrade reliability of a product. Further, it may be difficult to incorporate some electrical interconnection structures into a small-sized product due to their relatively low mounting density.

Optical interconnection technology using light in transmission of signals between semiconductor devices may be used an alternative to electrical interconnections.

SUMMARY

The embodiments of the present inventive concept provide a method for forming a light guide layer with improved transmission reliability in a semiconductor substrate.

According to an aspect of the present inventive concept, a method for forming a light guide layer in a semiconductor substrate, includes forming a trench in the semiconductor substrate, forming a cladding layer and a preliminary light guide layer in the trench and on the substrate such that only one of opposite side end portions of the preliminary light guide layer is in contact with an inner sidewall of the trench, and performing a thermal treatment on the substrate to change the preliminary light guide layer into the light guide layer.

According to an aspect of the present inventive concept, a method for forming a light guide layer in a semiconductor substrate includes preparing a semiconductor substrate having a trench, forming a preliminary light guide layer and a growth prevention layer in the trench such that one side end portion of the preliminary light guide layer is in contact with an inner sidewall of the trench, and the other side end portion and a lower portion of the preliminary light guide layer are in contact with the growth prevention layer, melting the preliminary light guide layer without melting the growth prevention layer, forming the light guide layer by epitaxial growth of the melted preliminary light guide layer, wherein one side end portion of the melted preliminary light guide layer in contact with the inner sidewall of the trench is a seed surface.

According to an aspect of the present inventive concept, a method for forming a light guide layer in a semiconductor substrate includes forming a trench in the semiconductor substrate, the semiconductor substrate including single crystalline silicon, sequentially forming, in the trench, a first cladding layer of amorphous silicon oxide and a preliminary light guide layer of amorphous or polycrystalline silicon such that opposite side end portions of each of the first cladding layer and the preliminary light guide layer are in contact with respective inner sidewalls of the trench, forming a first etching hole by etching only one of the opposite side end portions of the preliminary light guide layer in contact with one of the inner sidewalls of the trench, forming a second cladding layer on the substrate to fill up the first etching hole, the second cladding layer being formed of the same material as the first cladding layer, melting the preliminary light guide layer by irradiating laser light on the substrate, forming the light guide layer of the single crystalline silicon by epitaxial growth of the melted preliminary light guide layer, wherein one side end portion of the melted preliminary light guide layer remaining in contact with the other inner sidewall of the trench is a seed surface, removing the second cladding layer formed on the semiconductor substrate, forming a second etching hole by etching one side end portion of the light guide layer in contact with the other inner sidewall of the trench, and forming a third cladding layer on the substrate to fill up the second etching hole, the third cladding layer being formed of the same material as the first and second cladding layers.

According to an aspect of the present inventive concept, a semiconductor device comprises a semiconductor substrate, a trench in the semiconductor substrate, a first cladding layer formed on a bottom surface of the trench, a light guide layer formed on the first cladding layer, a second cladding layer formed between a first side end portion of the light guide layer and a first inner sidewall of the trench, wherein the second cladding layer is in contact with the first inner sidewall of the trench and the first side end portion of the light guide layer, and a third cladding layer formed between a second side end portion of the light guide layer and a second inner sidewall of the trench, and on a top surface of the light guide layer, wherein the third cladding layer is in contact with the second inner sidewall of the trench, and the second side end portion and the top surface of the light guide layer.

BRIEF DESCRIPTION OF THE DRAWINGS

The above and other aspects and features of the present inventive concept will become more apparent by describing in detail exemplary embodiments thereof with reference to the attached drawings, in which.

DETAILED DESCRIPTION

The embodiments of the present inventive concept may be understood more readily by reference to the following detailed description of exemplary embodiments and the accompanying drawings. The present inventive concept may, however, be embodied in many different forms and should not be construed as being limited to the embodiments set forth herein. In the drawings, sizes and relative sizes of layers and regions may be exaggerated for clarity. Throughout the specification, like reference numerals in the drawings may denote like elements.

An optical interconnection including a light guide layer formed in a semiconductor substrate in accordance with an embodiment of the present inventive concept will be described with reference to FIG. 1.

Figure 1:
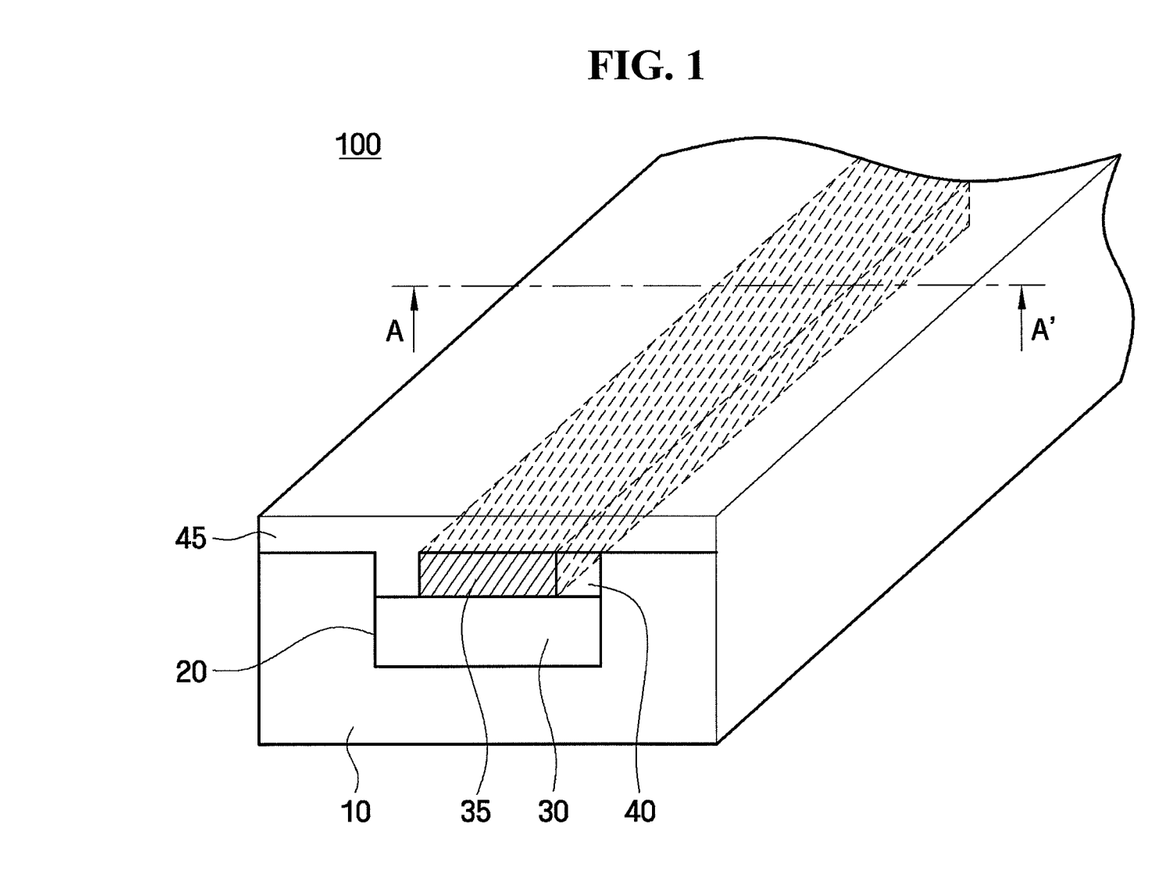
FIG. 1 schematically shows a perspective cross sectional view of an optical interconnection including a light guide layer formed in a semiconductor substrate in accordance with an embodiment of the present inventive concept.

FIG. 1 schematically shows a perspective cross sectional view of an optical interconnection including a light guide layer formed in a semiconductor substrate in accordance with an embodiment of the present inventive concept.

Referring to FIG. 1, an optical interconnection 100 includes a semiconductor substrate 10, cladding layers 30, 40 and 45, and a light guide layer 35.

The semiconductor substrate 10 is formed of a semiconductor material, e.g., single crystalline silicon (Si) or single crystalline germanium (Ge). According to an embodiment, a specific trench 20 is formed in the semiconductor substrate 10 such that the cladding layers 30, 40 and 45 and the light guide layer 35 are embedded in the trench 20 as shown in FIG. 1.

The cladding layers 30, 40 and 45 surround the light guide layer 35. Specifically, the cladding layers 30, 40 and 45 include a first cladding layer 30 formed in contact with a lower portion of the light guide layer 35, a second cladding layer 40 formed in contact with a right end portion of the light guide layer 35, and a third cladding layer 45 in contact with a left end portion and an upper portion of the light guide layer 35. Although the cladding layers 30, 40 and 45 include the first to third cladding layers in this embodiment, the present inventive concept is not limited thereto. According to an embodiment, the first to third cladding layers 30, 40 and 45 are formed of the same material and, are formed integrally with one another. The first and second cladding layers 30, 40 and part of the third cladding layer 45 are embedded in the trench 20 of the semiconductor substrate 10 while surrounding the light guide layer 35 as shown in FIG. 1.

When light is transmitted through the light guide layer 35, the first to third cladding layers 30, 40 and 45 prevent light passing though the light guide layer 35 from leaking out. Accordingly, an optical refractive index of a material of the first to third cladding layers 30, 40 and 45 is smaller than an optical refractive index of a material of the light guide layer 35 in order to reflect light into the light guide layer 35 at an interface between the light guide layer 35 and the first to third cladding layers 30, 40 and 45.

According to an embodiment, the first to third cladding layers 30, 40 and 45 are formed of an oxide of a material of the semiconductor substrate 10. Specifically, for example, if the semiconductor substrate 10 is formed of silicon (Si), the first to third cladding layers 30, 40 and 45 are formed of silicon oxide, and if the semiconductor substrate 10 is formed of germanium (Ge), the first to third cladding layers 30, 40 and 45 are formed of germanium oxide. More specifically, for example, if the semiconductor substrate 10 is formed of single crystalline silicon (Si), the first to third cladding layers 30, 40 and 45 are formed of amorphous silicon oxide (SiOx), and if the semiconductor substrate 10 is formed of single crystalline germanium (Ge), the first to third cladding layers 30, 40 and 45 are formed of amorphous germanium oxide (GeOx).

The light guide layer 35 functions as a light transmission path. The light guide layer 35 in accordance with the embodiment of the present inventive concept is formed of single crystalline silicon (Si). Specifically, the light guide layer 35 is formed of single crystalline silicon (Si) which is formed by epitaxial growth of Si crystals from the semiconductor substrate 10 of single crystalline silicon (Si) in one direction. A method for forming a light guide layer in a semiconductor substrate in accordance with an embodiment of the present inventive concept is described in detail below.

Although the third cladding layer 45 is shown as being formed on an entire upper surface of the substrate 10 in FIG. 1, the present inventive concept is not limited thereto. The position at which the third cladding layer 45 is formed and coverage of the third cladding layer 45 may be varied. For example, in an optical interconnection 100 in accordance with an embodiment of the present inventive concept, the third cladding layer 45 may be selectively formed only on an upper surface of the light guide layer 35.

A method for forming a light guide layer in a semiconductor substrate in accordance with the embodiment of the present inventive concept will be described with reference to FIGS. 2 to 8.

FIGS. 2 to 8 are cross sectional views taken along line A-A' of FIG. 1, showing steps of a method for forming a light guide layer in a semiconductor substrate in accordance with the embodiment of the present inventive concept. Herein, a preliminary light guide layer may refer to a layer in steps prior to formation of a light guide layer. Specifically, for example, the preliminary light guide layer may refer to a layer formed in advance of forming a light guide layer by epitaxial growth in accordance with the embodiment of the present inventive concept.

Figure 2:
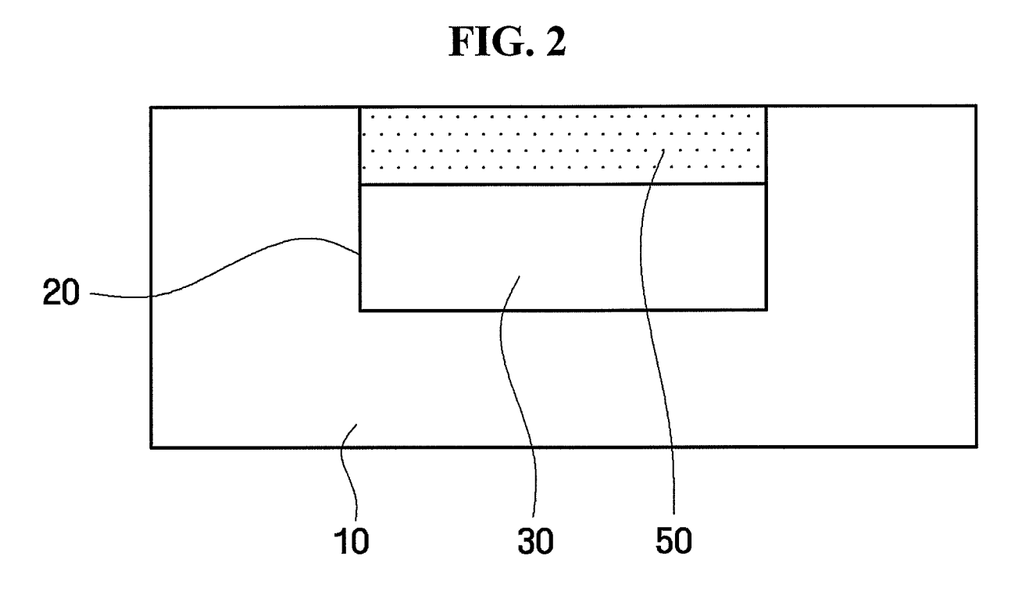
FIGS. 2 to 8 are cross sectional views taken along line A-A' of FIG. 1, showing steps of a method for forming a light guide layer in a semiconductor substrate in accordance with the embodiment of the present inventive concept.

Referring to FIG. 2, the trench 20 is formed in the semiconductor substrate 10. Then, the first cladding layer 30 and a preliminary light guide layer 50 are sequentially formed in the trench 20. Opposite side end portions of each of the first cladding layer 30 and the preliminary light guide layer 50 are formed to be in contact with an inner sidewall of the trench 20 as shown in FIG. 2.

According to an embodiment, the first cladding layer 30 is formed of a material having a melting temperature higher than those of materials of the semiconductor substrate 10 and the preliminary light guide layer 50. Further, the first cladding layer 30 is formed of a material having a thermal conductivity lower than those of materials of the semiconductor substrate 10 and the preliminary light guide layer 50.

For instance, in accordance with an embodiment, the semiconductor substrate 10 is formed of single crystalline silicon (Si) as described above, the first cladding layer 30 is formed of amorphous Si oxide, and the preliminary light guide layer 50 is formed of amorphous Si or polycrystalline Si. Alternatively, for example, the semiconductor substrate 10 is formed of single crystalline germanium (Ge), the first cladding layer 30 is formed of amorphous Ge oxide, and the preliminary light guide layer 50 is formed of amorphous Ge or polycrystalline Ge. In another alternative, the semiconductor substrate 10, the first cladding layer 30 and the preliminary light guide layer 50 are formed by various combinations of the above-mentioned materials.

Figure 3:
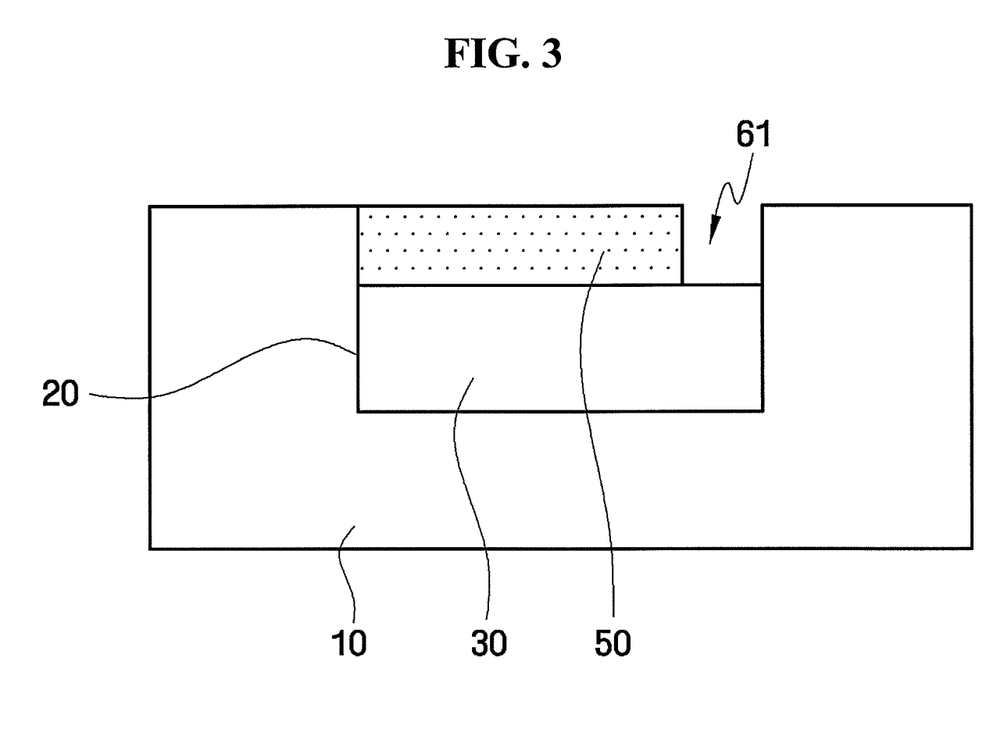

Referring to FIG. 3, a first etching hole 61 is formed. Specifically, one of the opposite side end portions of the preliminary light guide layer 50 in contact with the trench 20 is etched to form the first etching hole 61. The other side end portion of the preliminary light guide layer 50 at which the first etching hole 61 is not formed is maintained to be in contact with the inner sidewall of the trench 20. That is, only one of the opposite side end portions of the preliminary light guide layer 50 is in contact with the inner sidewall of the trench 20.

The first etching hole 61 may be formed by various etching methods. For example, the first etching hole 61 may be formed by dry etching, or by wet etching. According to an embodiment, the first etching hole 61 is formed such that only a portion of the preliminary light guide layer 50 is selectively etched as shown in FIG. 3 by using etching selectivity between the preliminary light guide layer 50 and the first cladding layer 30.

Figure 4:
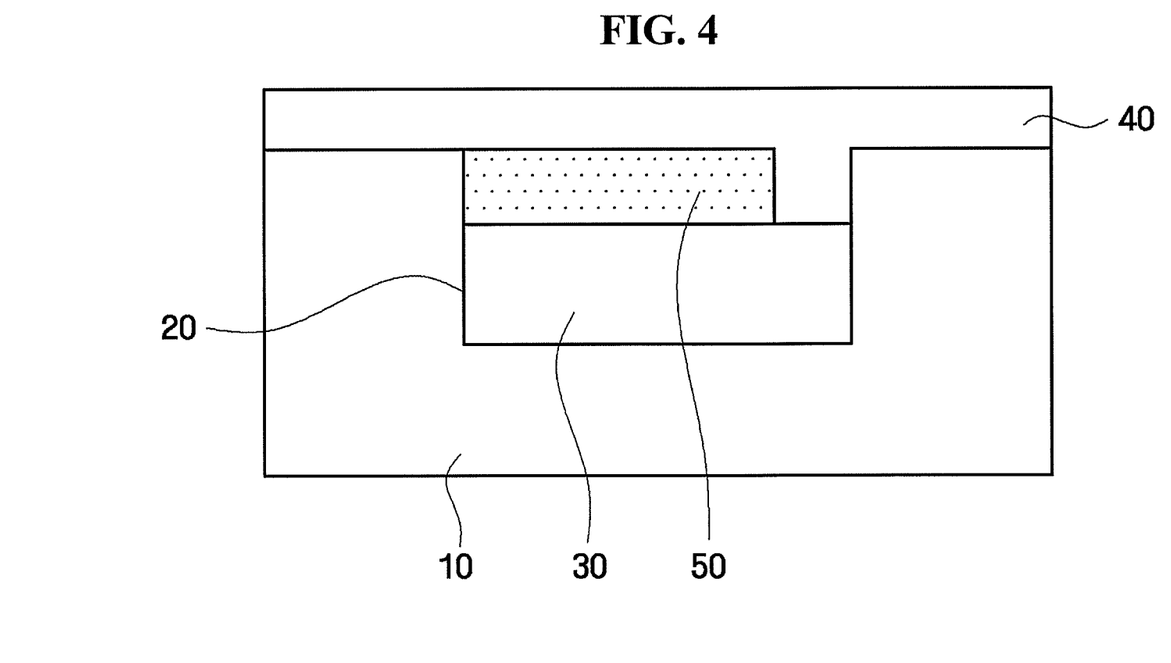

Referring to FIG. 4, the second cladding layer 40 is formed on the semiconductor substrate 10. According to an embodiment, the second cladding layer 40 is formed to fill up the first etching hole 61 (see FIGS. 3 and 4). The second cladding layer 40 formed on the semiconductor substrate 10 to fill up the first etching hole 61 may be formed by using various deposition methods (e.g., chemical vapor deposition (CVD) and plasma enhanced chemical vapor deposition (PECVD)). When the second cladding layer 40 is formed as described above, the remaining region of the preliminary light guide layer 50 excluding any one side end portion thereof in contact with the inner sidewall of the trench 20 is surrounded by the cladding layers 30 and 40.

According to an embodiment, the second cladding layer 40 is formed of the same material as that of the first cladding layer 30 as described above. Particularly, the second cladding layer 40 is formed of a material having a thermal conductivity lower than that of a material of the preliminary light guide layer 50 or the semiconductor substrate 10 because the first and second cladding layers 30 and 40 function as a growth prevention layer for epitaxial growth of the preliminary light guide layer 50 in one direction, which will be described in detail below. Also, according to an embodiment of the present inventive concept, the first and second cladding layers 30 and 40 are formed of a material having a melting temperature higher than that of a material of the preliminary light guide layer 50 or the semiconductor substrate 10 in order to melt only the preliminary light guide layer 50 without melting the first and second cladding layers 30 and 40 during thermal treatment of the semiconductor substrate 10. According to an embodiment, in order to have the higher melting point, the first and second cladding layers 30 and 40 are formed of, e.g., oxide of a material of the semiconductor substrate 10 or the preliminary light guide layer 50.

Figure 5:
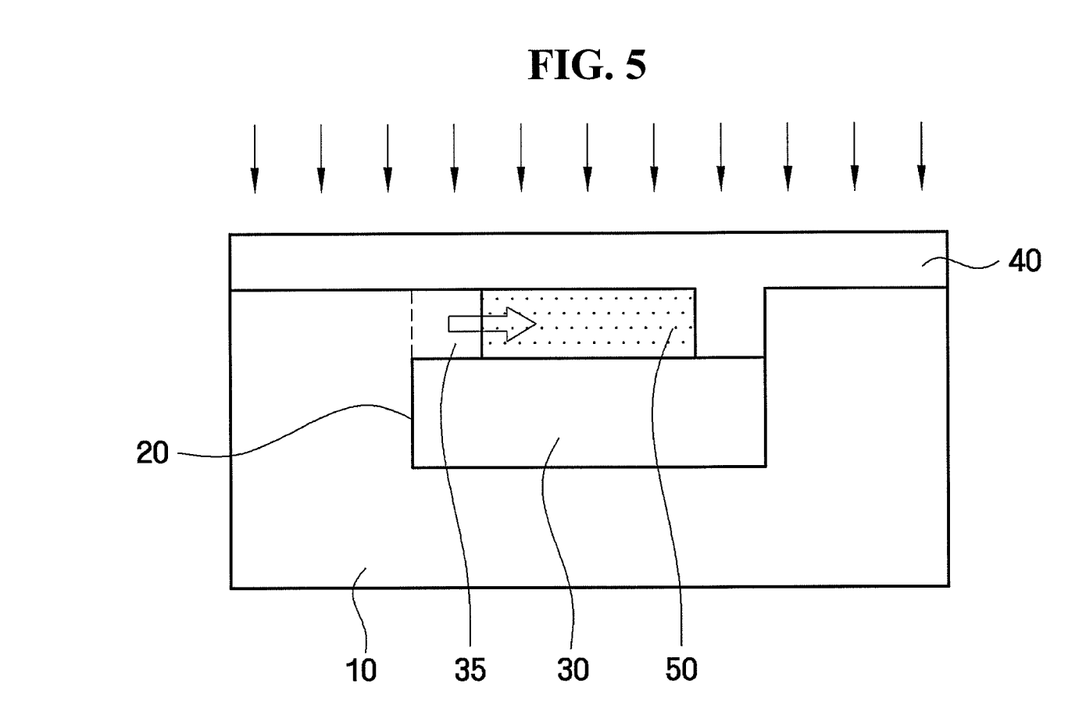
Figure 6:
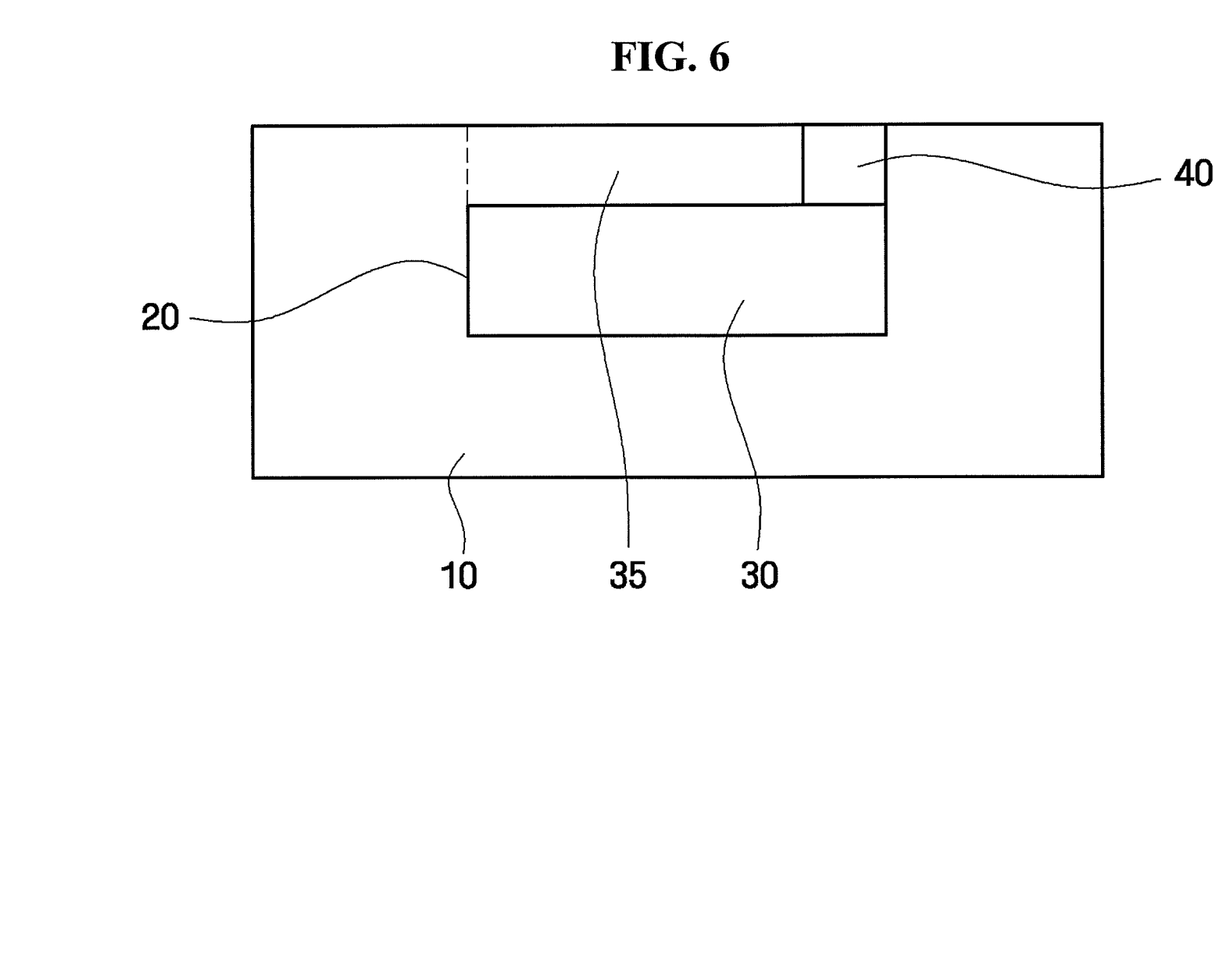

Referring to FIGS. 5 and 6, thermal treatment is performed on the semiconductor substrate 10 to cause epitaxial growth of the preliminary light guide layer 50 from the semiconductor substrate 10, thereby forming the light guide layer 35.

Specifically, referring to FIG. 5, for example, laser light is irradiated onto the semiconductor substrate 10 at 1.0 J/cm$^2$ for 25 ns by using a 2w Nd:YAG laser, thereby melting only the preliminary light guide layer 50. By such laser irradiation, the temperature of the semiconductor substrate 10 is raised to a temperature higher than the melting temperature of the preliminary light guide layer 50 and lower than the melting temperature of the first and second cladding layers 30 and 40, so that only the preliminary light guide layer 50 is melted without melting the first and second cladding layers 30 and 40.

Referring to FIGS. 5 and 6, the light guide layer 35 is formed by epitaxial growth of the melted preliminary light guide layer 50 from the semiconductor substrate 10. That is, while one side end portion of the preliminary light guide layer 50 in contact with the inner sidewall of the trench 20 serves as a seed surface, epitaxial growth of the melted preliminary light guide layer 50 is conducted from the one side end portion to the other side end portion in contact with the second cladding layer 40, thereby forming the light guide layer 35. For example, if the semiconductor substrate 10 is formed of single crystalline silicon (Si), the light guide layer 35 is formed by conducting the epitaxial growth of the preliminary light guide layer 50 of the melted Si layer from the one side end portion in contact with the semiconductor substrate 10 to the other side end portion in contact with the second cladding layer 40 such that the preliminary light guide layer 50 has the same single crystalline silicon (Si) as the semiconductor substrate 10.

The first and second cladding layers 30 and 40 have a thermal conductivity lower than that of the preliminary light guide layer 50 and the semiconductor substrate 10 as described above. Accordingly, the first and second cladding layers 30 and 40 prevent epitaxial growth of the melted preliminary light guide layer 50 from a lower portion of the preliminary light guide layer 50 in contact with the first cladding layer 30 and the other side end portion of the preliminary light guide layer 50 in contact with the second cladding layer 40. In other words, the first and second cladding layers 30 and 40 function as a growth prevention layer.

As described above, in the method for forming a light guide layer in a semiconductor substrate in accordance with the embodiment of the present inventive concept, the growth of crystals in the melted preliminary light guide layer 50 occurs only from one side end portion toward the other side end portion, and does not occur from a lower portion and the other side end portion. Accordingly, a grain boundary is not formed in the grown crystals, i.e., a grain boundary is not formed in the light guide layer 35.

Differently from the case in which the growth of crystals occurs only from one side end portion toward the other side end portion, if growth of crystals occurs from a lower portion or the other side end portion of the preliminary light guide layer 50, a grain boundary is formed at a boundary between crystals grown in different directions. The grain boundary may disperse light transmitted through the light guide layer 35 to increase optical loss, and deteriorate distribution characteristics of transmitted light. Accordingly, an optical interconnection including a light guide layer having a grain boundary may have relatively poor reliability in light transmission.

However, the light guide layer 35 formed by a method for forming a light guide layer in accordance with an embodiment of the present inventive concept does not have such a grain boundary therein, thereby improving reliability in light transmission of the light guide layer 35, and of the optical interconnection 100.

Figure 7:
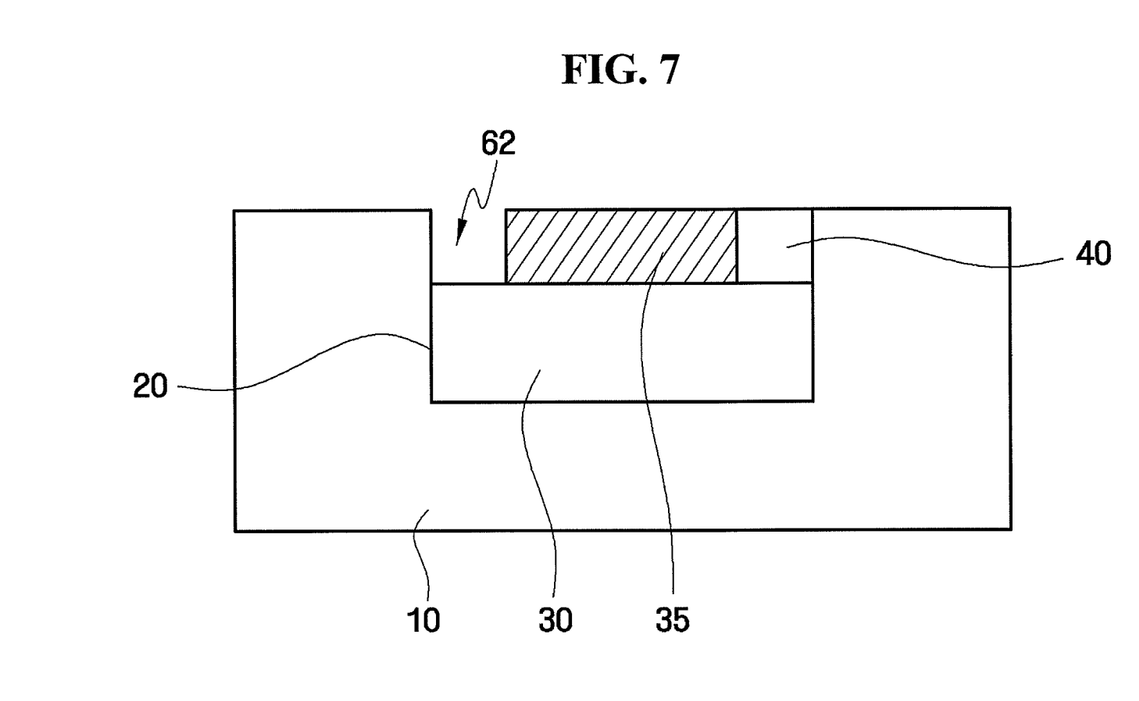

Referring to FIGS. 6 and 7, after the light guide layer 35 is formed by epitaxial growth, a portion of the second cladding layer 40 formed at the top of the semiconductor substrate 10 is removed. Then, one side end portion of the light guide layer 35 in contact with the inner sidewall of the trench 20 of the semiconductor substrate 10 is etched to form a second etching hole 62. According to an embodiment, the second etching hole 62 is formed by the same method used for forming the first etching hole 61.

Figure 8:
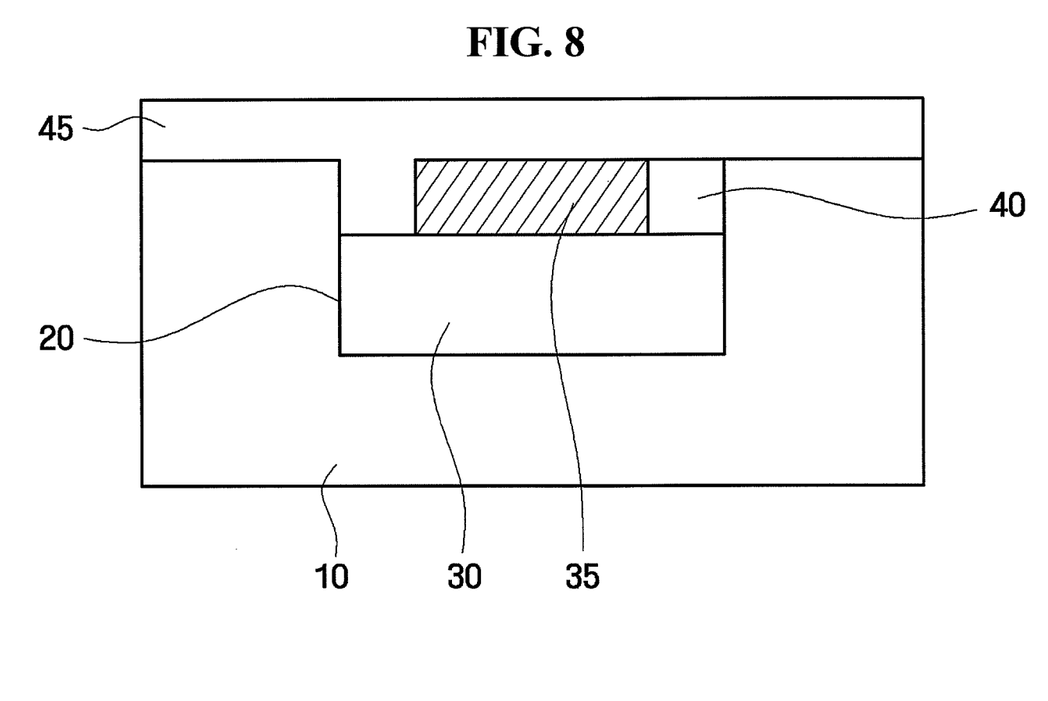

Referring to FIGS. 1 and 8, the third cladding layer 45 is formed on the semiconductor substrate 10. The third cladding layer 45 is formed to fill up the second etching hole 62 (see FIGS. 7 and 8). According to an embodiment, the third cladding layer 45 may be formed by the same method as used for forming the second cladding layer 40.

When the first to third cladding layers 30, 40 and 45 are formed by the above-described method, the first to third cladding layers 30, 40 and 45 are formed to completely surround the light guide layer 35 as shown in FIGS. 1 and 8. The first to third cladding layers 30, 40 and 45 reflect light leaking from the light guide layer 35 back into the light guide layer 35.

A semiconductor device system using the optical interconnection in accordance with an embodiment of the present inventive concept will be described with reference to FIG. 9.

Figure 9:
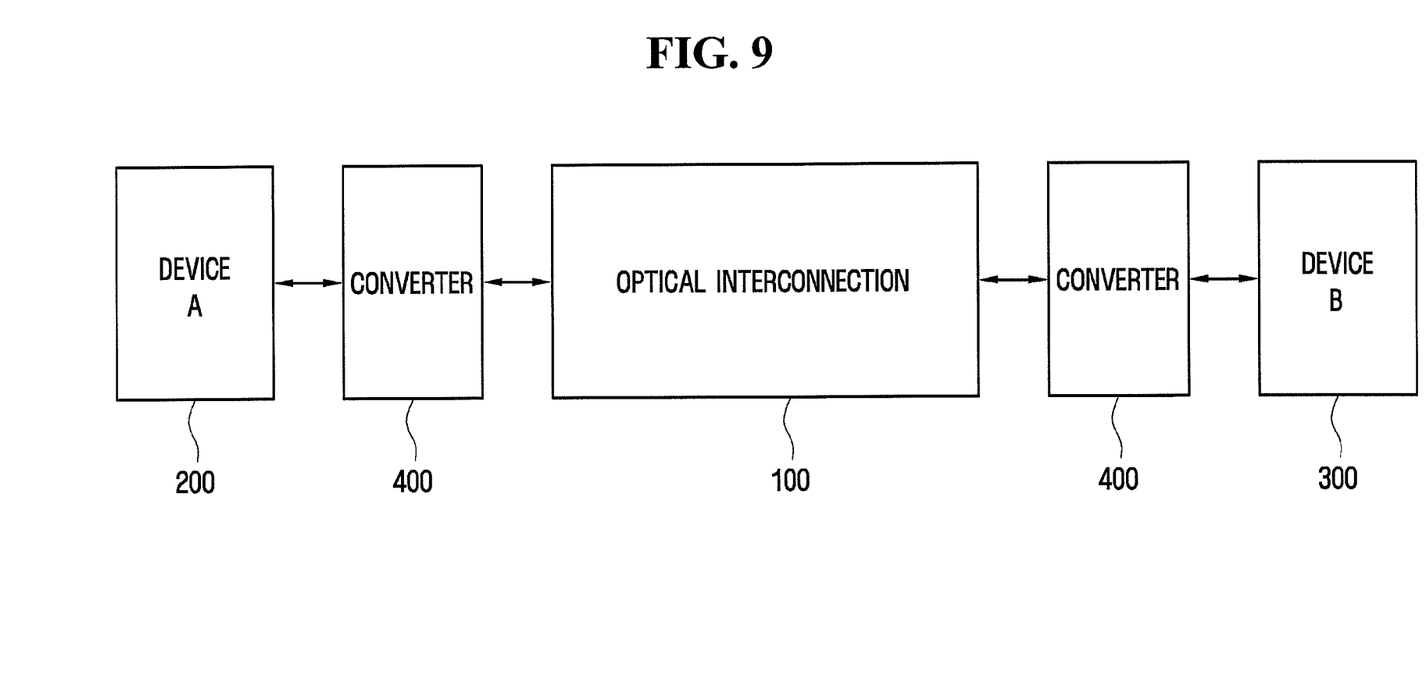
FIG. 9 is a block diagram of a semiconductor device system using the optical interconnection in accordance with an embodiment of the present inventive concept.

FIG. 9 is a conceptual diagram of a semiconductor device system using the optical interconnection in accordance with an embodiment of the present inventive concept.

Referring to FIG. 9, the semiconductor device system includes the optical interconnection 100, a first semiconductor device 200, a second semiconductor device 300 and a photoelectric converter 400.

The optical interconnection 100 functions as a transmission path for an optical signal and is an optical interconnection with improved reliability in light transmission in accordance with the embodiment of the present inventive concept.

The first and second semiconductor devices 200 and 300 may include various devices using a semiconductor substrate, e.g., a memory device storing data, an operation device such as CPU, and a control device controlling various signals.

According to an embodiment, the photoelectric converter 400 is a device which converts an electrical signal into an optical signal and vice versa. Since the first and second semiconductor devices 200 and 300 may be operated by an electrical signal, there is need for a device which converts an electrical signal outputted from the first and second semiconductor devices 200 and 300 into an optical signal. The photoelectric converter 400 converts an electrical signal outputted from the first and second semiconductor devices 200 and 300 into an optical signal and provides the optical signal to the optical interconnection 100, and also converts an optical signal outputted from the optical interconnection 100 into an electrical signal and provides the electrical signal to the first and second semiconductor devices 200 and 300.

According to an embodiment, if the first and second semiconductor devices 200 and 300 are operated by an optical signal instead of being operated by an electrical signal, the photoelectric converter 400 may be omitted.

Examples of the semiconductor device system using the optical interconnection include a two-way communication system, a one-way pager, a two-way pager, a personal communication system, a portable computer system, a personal data assistant (PDA), an audio and/or video player system, a digital and/or video camera system, a navigation system, and the like.

While the present inventive concept has been particularly shown and described with reference to exemplary embodiments thereof, it will be understood by those of ordinary skill in the art that various changes in form and detail may be made therein without departing from the spirit and scope of the present inventive concept as defined by the following claims. The exemplary embodiments should be considered in a descriptive sense and not for purposes of limitation.

What is claimed is:

1. A method for forming a light guide layer in a semiconductor substrate, the method comprising:
    forming a trench in the semiconductor substrate;
    forming a cladding layer and a preliminary light guide layer in the trench, wherein one of opposite side end portions of the preliminary light guide layer, and not the other opposite side end portion, is in contact with an inner sidewall of the trench; and
    performing a thermal treatment on the semiconductor substrate to change the preliminary light guide layer into the light guide layer.

2. The method of claim 1, wherein said forming the cladding layer and the preliminary light guide layer comprises:
    forming the cladding layer to surround a remaining region of the preliminary light guide layer excluding the one of the opposite side end portions in contact with the inner sidewall of the trench.

3. The method of claim 2, wherein forming the cladding layer to surround the remaining region of the preliminary light guide layer comprises:
    sequentially forming, in the trench, a first cladding layer and the preliminary light guide layer such that opposite side end portions of each of the first cladding layer and the preliminary light guide layer are in contact with the inner sidewall of the trench;
    forming a first hole in the preliminary light guide layer by etching one of the opposite side end portions of the preliminary light guide layer in contact with the inner sidewall of the trench; and
    forming a second cladding layer on the semiconductor substrate, wherein the second cladding layer fills the first hole.

4. The method of claim 3, further comprising forming a second hole by etching one side end portion of the light guide layer in contact with the inner sidewall of the trench; and
    forming a third cladding layer on the semiconductor substrate, wherein the third cladding layer fills the second hole.

5. The method of claim 1, wherein said performing the thermal treatment comprises:
    irradiating laser light on the substrate to melt the preliminary light guide layer; and
    forming the light guide layer by epitaxial growth of the melted preliminary light guide layer from the semiconductor substrate.

6. The method of claim 5, wherein a melting point of the cladding layer is higher than a melting point of the preliminary light guide layer.

7. The method of claim 5, wherein a thermal conductivity of the cladding layer is lower than a thermal conductivity of the preliminary light guide layer or the semiconductor substrate.

8. The method of claim 5, wherein the cladding layer includes an oxide of a material of the preliminary light guide layer or of the semiconductor substrate.

9. The method of claim 1, wherein the preliminary light guide layer includes at least one of amorphous silicon (Si), amorphous germanium (Ge), polycrystalline silicon (Si) and polycrystalline germanium (Ge).

10. The method of claim 1, wherein an optical refractive index of the cladding layer is lower than an optical refractive index of the light guide layer.

11. A method for forming a light guide layer in a semiconductor substrate, the method comprising:
    preparing a semiconductor substrate having a trench;
    forming a preliminary light guide layer and a growth prevention layer in the trench, wherein one side end portion of the preliminary light guide layer is in contact with an inner sidewall of the trench, and the other side end portion and a lower portion of the preliminary light guide layer are in contact with the growth prevention layer;
    melting the preliminary light guide layer without melting the growth prevention layer;
    forming the light guide layer by epitaxial growth of the melted preliminary light guide layer, wherein the one side end portion of the melted preliminary light guide layer remaining in contact with the inner sidewall of the trench is a seed surface.

12. The method of claim 11, wherein a thermal conductivity of the growth prevention layer is lower than a thermal conductivity of the preliminary light guide layer.

13. The method of claim 12, wherein the semiconductor substrate includes a single crystalline silicon substrate, the preliminary light guide layer includes an amorphous silicon or polycrystalline silicon layer, and the growth prevention layer includes an amorphous silicon oxide layer.

14. The method of claim 12, wherein the semiconductor substrate includes a single crystalline germanium substrate, the preliminary light guide layer includes an amorphous germanium or polycrystalline germanium layer, and the growth prevention layer includes an amorphous germanium oxide layer.

15. The method of claim 11, wherein melting the preliminary light guide layer without melting the growth prevention layer comprises irradiating YAG laser light on the semiconductor substrate, wherein a temperature of the semiconductor substrate is raised to a temperature higher than a melting point of the preliminary light guide layer and lower than a melting point of the growth prevention layer.

16. The method of claim 15, wherein irradiating YAG laser light on the semiconductor substrate comprises irradiating laser light on the semiconductor substrate at 1.0 J/cm$^2$ for 25 ns using a 2w Nd:YAG laser.

17. The method of claim 11, wherein the epitaxial growth of the melted preliminary light guide layer is conducted from the one side end portion in contact with the inner sidewall of the trench toward the other side end portion in contact with the growth prevention layer.

18. The method of claim 11, wherein the growth prevention layer includes an oxide of a material of the preliminary light guide layer or of the semiconductor substrate.

19. The method of claim 11, wherein an optical refractive index of the growth prevention layer is lower than an optical refractive index of the light guide layer.

20. A method for forming a light guide layer in a semiconductor substrate, the method comprising:

forming a trench in the semiconductor substrate, the semiconductor substrate including single crystalline silicon;

sequentially forming, in the trench, a first cladding layer including amorphous silicon oxide and a preliminary light guide layer including amorphous or polycrystalline silicon, wherein opposite side end portions of each of the first cladding layer and the preliminary light guide layer are in contact with respective inner sidewalls of the trench;

forming a first hole by etching one of the opposite side end portions of the preliminary light guide layer in contact with one of the inner sidewalls of the trench;

forming a second cladding layer on the semiconductor substrate, wherein the second cladding layer fills the first hole, and includes the same material as the first cladding layer;

melting the preliminary light guide layer by irradiating laser light on the semiconductor substrate;

forming the light guide layer of the single crystalline silicon by epitaxial growth of the melted preliminary light guide layer, wherein the one side end portion of the melted preliminary light guide layer remaining in contact with the other inner sidewall of the trench is a seed surface;

removing a portion of the second cladding layer not formed in the first hole;

forming a second hole by etching one side end portion of the light guide layer in contact with the other inner sidewall of the trench; and forming a third cladding layer on the semiconductor substrate, wherein the third cladding layer fills the second hole, and includes the same material as the first and second cladding layers.

* * * * *